United States Patent
Hecker et al.

(10) Patent No.: US 9,178,265 B2
(45) Date of Patent: Nov. 3, 2015

(54) ANTI-CRACK MEANS FOR WIRE ANTENNA IN TRANSPONDER

(71) Applicant: HID GLOBAL GMBH, Walluf (DE)

(72) Inventors: Hermann Hecker, Berlin (DE); Paul Shane Doran, Galway (IE)

(73) Assignee: HID GLOBAL GMBH, Walluf (DE)

( * ) Notice: Subject to any disclaimer, the term of this patent is extended or adjusted under 35 U.S.C. 154(b) by 264 days.

(21) Appl. No.: 13/757,021

(22) Filed: Feb. 1, 2013

(65) Prior Publication Data

US 2013/0207874 A1 Aug. 15, 2013

(30) Foreign Application Priority Data

Feb. 9, 2012 (CH) ........................... 0176/12

(51) Int. Cl.
*H01Q 1/40* (2006.01)
*H01Q 1/00* (2006.01)
*G06K 19/077* (2006.01)

(52) U.S. Cl.
CPC .......... *H01Q 1/002* (2013.01); *G06K 19/07728* (2013.01)

(58) Field of Classification Search
CPC ............................................... G06K 19/07728
USPC .................. 343/873, 866, 867, 795, 741, 742
See application file for complete search history.

(56) References Cited

U.S. PATENT DOCUMENTS

| 6,081,025 | A | 6/2000 | Prancz | |
|---|---|---|---|---|
| 6,630,370 | B2 | 10/2003 | Kasahara et al. | |
| 7,492,326 | B1* | 2/2009 | Bodlovic et al. | 343/873 |
| 2001/0043162 | A1* | 11/2001 | Babb | 343/895 |
| 2007/0278315 | A1 | 12/2007 | Michalk | |
| 2008/0001844 | A1* | 1/2008 | Sabbah et al. | 343/873 |
| 2008/0283615 | A1* | 11/2008 | Finn | 235/488 |
| 2009/0179817 | A1* | 7/2009 | Yin | 343/866 |
| 2009/0291271 | A1 | 11/2009 | Michalk et al. | |

FOREIGN PATENT DOCUMENTS

| DE | 19710656 | 9/1998 |
|---|---|---|
| DE | 19710656 A1 | 9/1998 |
| EP | 2001077 | 12/2008 |
| EP | 2001077 A1 | 12/2008 |
| EP | 2116366 | 11/2009 |

(Continued)

OTHER PUBLICATIONS

Extended European Search Report for European Patent Application No. 13154322.5 dated Jun. 18, 2013, 6 pages.

(Continued)

*Primary Examiner* — Dameon E Levi
*Assistant Examiner* — Hasan Islam
(74) *Attorney, Agent, or Firm* — Sheridan Ross P.C.

(57) ABSTRACT

The invention concerns a support for an antenna, such as a RFID antenna, used in a flexible cover, for example a passport cover, whereby said antenna is surrounded by material of said cover. Said support comprises means for disconnecting the antenna from the surrounding material so that bending stress applied to said material is not transferred to the antenna. The support may be used in different products, for example in passports.

19 Claims, 2 Drawing Sheets

(56) References Cited

FOREIGN PATENT DOCUMENTS

| | | |
|---|---|---|
| JP | 2010-044684 | 2/2010 |
| JP | 2010044684 A | 2/2010 |
| WO | WO 2006000849 A1 | 1/2006 |
| WO | WO 2008047436 A1 | 4/2008 |
| WO | WO 2008129526 A2 | 10/2008 |
| WO | WO 2010/094790 | 8/2010 |
| WO | WO 2010086904 A1 | 8/2010 |

OTHER PUBLICATIONS

Search Report prepared by the Swiss Patent Office for Swiss Application No. CH00176/12 on Apr. 17, 2012.

* cited by examiner

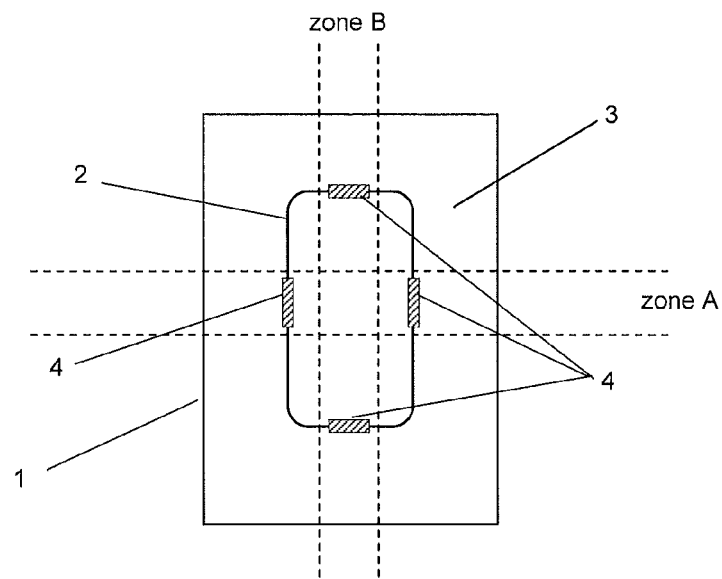
Fig. 1
Fig. 2a
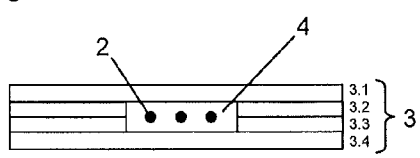
Fig. 2b
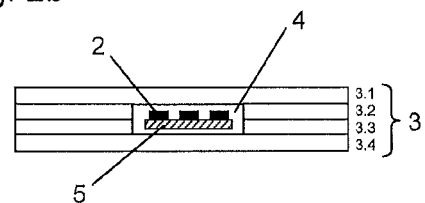
Fig. 2c
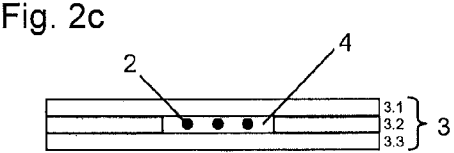
Fig. 2d
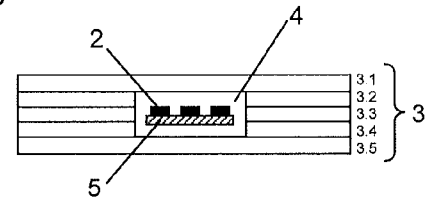

Fig 3a
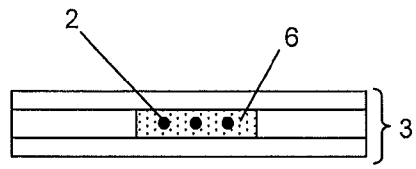
Fig 3b
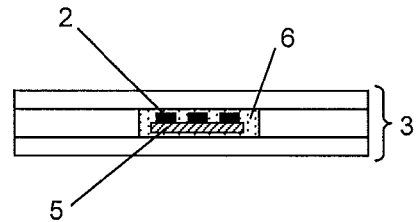
Fig 4a
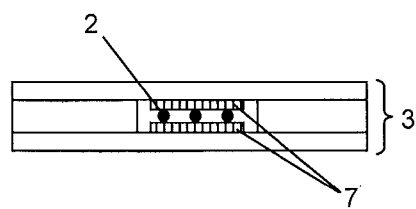
Fig 4b
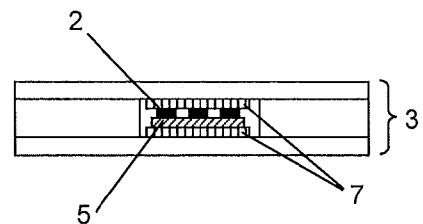
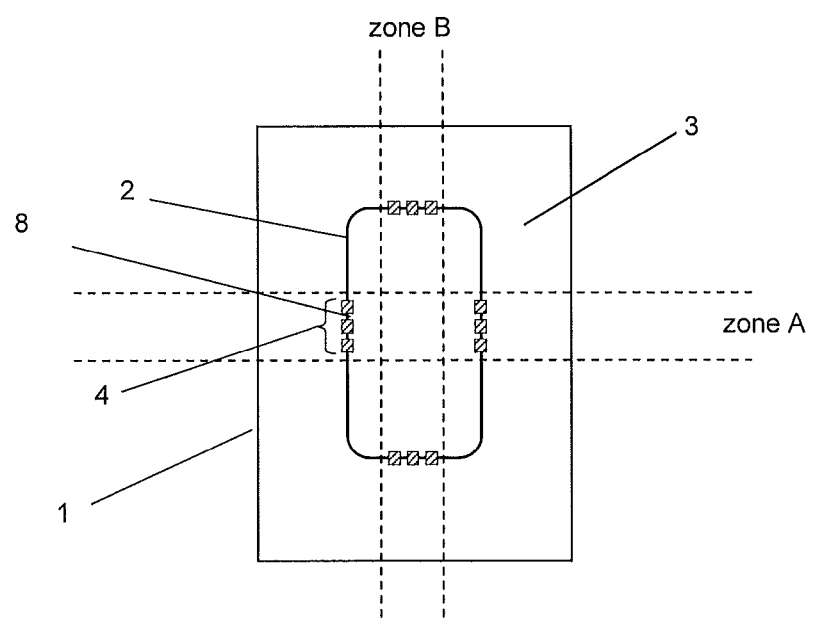
Fig. 5

ANTI-CRACK MEANS FOR WIRE ANTENNA IN TRANSPONDER

CROSS-REFERENCE TO RELATED APPLICATION

This application claims the benefit of Swiss Patent Application No. CH 00176/12 filed Feb. 9, 2012, the entire disclosure of which is incorporated herein by reference.

TECHNICAL FIELD

The present invention concerns the field of transponders such as RFID transponders which are used in numerous products, for example in passports and other similar products which undergo significant stress during their lifetime.

BACKGROUND OF THE INVENTION AND PRIOR ART

Mechanical durability is a key feature of RFID transponders used in passports which experience significant mechanical stresses during their life cycle. The life cycle of passports is usually ten years and they must remain functional during this period. This constraint does not only apply to their physical integrity but also to the electrical function of the enclosed RFID transponder.

Repeated bending of the passport is one of the major threats to the enclosed RFID transponder. Indeed, the passport can be bent when carried in a backpocket, in pockets of a jacket or coat and repeated bending results in buckling of the RFID antenna which then causes a break of the antenna or such an alteration of the antenna's electrical properties which then results in a failure of the transponder.

Broken antennas occur in particular in passports which have a transponder enclosed in the passport cover. Indeed, the cover has a tendency to buckle when bent, which forces the enclosed antenna to buckle as well. Further bending then concentrates the bending stress on the area of buckling which rapidly causes a failure of the antenna and therefore of the entire transponder.

There are different approaches to minimize the buckling of a passport cover. One approach is to support the cover with a rigid and stiff layer. This thus prevents the passport from being bent. However, most countries do not accept a "hard" passport and prefer the haptics of a flexible passport booklet.

Another approach is to use textile based cover material. Textile materials can be bent without buckling. However, one disadvantage of such textile based cover material is their high costs. Another disadvantage is that textile cover materials are more difficult to emboss with a security embossing than paper based cover materials.

Today, most commonly used solutions are paper based cover materials because of their low cost and their good properties with respect to security technologies like embossing, security fibers, blanchetes etc. The downside of these materials is that they easily buckle when bent causing antenna failures and hence only provide a low resistance against passport bending.

Document DE19710656 discloses a smart card includes electronic component(s) and a base sheet. The invention there was the task of creating a smart card which is easy to manufacture and which avoids the tendency to gaping during a prolonged use. To this effect, a core sheet is joined to the base sheet and the core sheet has one or more regions stamped out to accommodate the component(s), including e.g. an antenna coil. The component is embedded with a filler in the stamped-out region the filler being initially in fluid form.

Document U.S. Pat. No. 6,630,370 relates to a process for manufacturing an IC card. More particularly, the present invention relates to a process for manufacturing an IC card having a plane coil with bent portions in which a conductor line is wound a plurality of times on substantially the same plane, and terminals of the plane coil and electrode terminals of a semiconductor element are electrically connected to each other. The idea here is to provide a method of manufacturing an IC card and an IC card avoiding a short circuit is caused by deformation of the conductor lines generated by an external force given to the plane coil in the traverse direction. The card comprises tape members which are bonded to a plurality of positions of the plane coil. The tape members are composed in such a manner that an adhesive layer is formed on one side of the tape member. In a portion to which this tape member is bonded, adhesive which has entered a space between the wound conductors is solidified, so that the conductors can be fixed while a predetermined interval can be provided between them. Therefore, even if an external force is given to the plane coil in the traverse direction, each conductor is not deformed. Accordingly, the occurrence of a short circuit caused by contact between the conductors can be prevented.

Document US 2007/0278315 relates to a flat transponder having an electronic circuit which is arranged in a layer or in a layer composite and which contains at least one chip and conductor tracks or conductor wires. The invention here is based on the object of specifying a transponder which is flexible, has the most uniform thickness possible and can be bonded to further elements by means of water-based adhesives, its electronic components being protected against damage by bending and against being detected by feel. One or both covering layers and, if appropriate, the partial layers of plastic arranged adjacently above it or under it are notched with incisions, so that the intrinsically stiff laminate with the circuit located in the interior of the laminate bends over at the notched points under bending loading, even with relatively low forces. The notches may be produced by drawn or punched incisions using special knives, by grinding, by sawing in, by laser cutting, etc.

A first notch pattern may be notched in with the lamination, and a second notch pattern can be notched in by means of additional notching following the lamination.

The notch depth and the notch cut density can be applied differently for regions of the laminate surface. In order not to be able to detect the module or chip in the laminate by feel and to prevent the conductor wires or conductor tracks from bending over at the module or chip connection, it is preferred not to flexibilize the regions surrounding the module or chip or to flexibilize them only slightly, in order additionally to make detecting the module or chip by feel more difficult.

Document US 2009/0291271 relates to a functional laminate for smart cards, ID cards, credit cards and the like which is able to absorb mechanical stress caused by shrinkage of the cover layer in the laminating process. To this effect, it is made from at least two co-laminated layers, at least one of which is a patchwork layer consisting of zones of multiple types distinct from each other such that mechanical stress may be absorbed by the zones when the functional laminate is subjected to heat thus keeping the functional laminate from breaking or delaminating. Such a functional laminate may be used in smart cards leading to an increased service life.

Document WO 2010/094790 relates to a functional laminate which is able to absorb mechanical stress caused by shrinkage of materials used in the laminating production process. According to an embodiment of the invention of this document, a method for manufacturing a functional laminate comprises at least the following steps:

providing an inlay formed of at least two layers which have been laminated together with a functional element, such that the functional element is at least partially embedded in the inlay;

forming at least one recess on the inlay in an area adjacent to the functional component;

laminating the inlay with at least one additional layer in such a manner that the width of said recess or recesses is (are) considerably reduced or said recess or recesses is (are) substantially closed at least by surrounding material after lamination by virtue of shrinking of the functional laminate.

In a functional laminate manufactured by this method, mechanical tensions due to heat induced shrinking of the substrate sheet or the at least one additional layer are reduced or removed by the recesses that are substantially closed or whose width is considerably reduced after lamination. Hence, the functional component and its contact areas, if applicable, are not subjected to these tensions, neither during the lamination procedure nor after. A risk of failure of the functional components due to cracks or warping is thus tremendously reduced. The recesses are formed at the latest before a final lamination step of the functional laminate. The characteristic of the final functional laminate is not significantly affected by the recesses since they are at least almost shut after the lamination step.

Safety documents and other plastic cards incorporating such a functional laminate may thus exhibit an increased service life and an improved optical quality by reduced surface unevenness.

Document DE 10 2004 027 978 discloses a semiconductor chip module which is located with an antenna between cover sheets. The chip is connected by tracks to the antenna terminals. Antenna and module are embedded in adhesive between the cover sheets (5) in one region.

SUMMARY OF THE INVENTION

It is an aim of the present invention to improve the known products and methods, It is a further aim of the present invention to provide a solution to increase the mechanical stress resistance of RFID antennas, which are enclosed in passport covers or other similar products that are subject to stress such as bending or buckling stress.

This problem is solved by a design and means in a functional laminate, which mechanically disconnects discrete portions (and not the entire) of the antenna from the surrounding material of the laminate in the stress zones.

This measure avoids that stress (for example bending or buckling) is transferred from the surrounding material to the antenna as the antenna is no more forced to follow the movements of the surrounding materials.

In an embodiment the invention concerns a functional laminate with an antenna to be connected to a RFID chip, said antenna being embedded in a surrounding support material, wherein means for disconnecting the antenna from the surrounding material are provided to discrete portions of the antenna.

In an embodiment said means for disconnecting comprise one or several cavities around said discrete portions of the antenna where the surrounding material is left out such that, in said cavities, the discrete portions of the antenna are not attached to surrounding material.

In an embodiment said support material comprises a plurality of layers bonded together, and said cavities are defined by openings in at least one of the layers directly proximate to the antenna.

In an embodiment each of said plurality of layers can be one of an adhesive layer, a thermoplastic layer, a plastic layer, a textile layer, a non woven layer, a foam layer or similar.

In an embodiment the antenna is made of a conductive wire.

In an embodiment the antenna is made of a conductive path, like a printed or etched antenna, and wherein at least in the discrete portions of the antenna, the conductive path is supported by an antenna carrier.

In an embodiment the cavities are filled with a filler material such that the discrete portions of the antenna are embedded in said filler material and disconnected from surrounding material.

In an embodiment at least one release layer is positioned in direct proximity of the discrete portions of the antenna in order to ensure that the portion of the antenna remain mechanically disconnected from the surrounding material.

In an embodiment the means for disconnecting the antenna from the surrounding material are applied in zones of the functional laminate which are intended or at risk to be submitted to bending, buckling or similar mechanical stresses.

In an embodiment the discrete portions, the antenna has a curved or meander shape design.

In an embodiment the functional laminate is part or is inserted in a flexible identity document, as for example a passport, a passport cover or another similar document.

BRIEF DESCRIPTION OF THE DRAWINGS

FIG. 1 shows an illustration of an embodiment of the invention in top view;

FIGS. 2a to 2d illustrate a cut view of embodiments of the invention;

FIGS. 3a and 3b illustrate a cut view of other embodiments of the invention;

FIGS. 4a and 4b illustrate a cut view of other embodiments of the invention;

FIG. 5 shows an illustration of another embodiment of the invention in top view;

DETAILED DESCRIPTION OF THE INVENTION

Passport and other similar documents are usually made from several layers which are linked to one another by adhesives or thermoplasts.

FIG. 1 shows, in top view, a functional laminate 1 forming a layer/support, suitable for use for example in the cover of a passport, with an antenna 2 and cavities 4 where an adhesive or thermoplast layer used in the fabrication of the support/laminate is partially left out in the proximity of the antenna 2. This absence of adhesive or thermoplast or, more generally material layer allows a mechanical decoupling of the antenna from its environment in accordance with the principles of the present invention.

The cavities 4 are of course chosen in zones (as A or B in FIG. 1) which are most likely to be deformed or buckled considering the shape of the functional laminate and the product in which it is to be used.

FIGS. 2a and 2c show a section of a decoupled area between the antenna 2 and the surrounding material using an example of a wire antenna 2. The cavities 4 correspond typically to the one illustrated in FIG. 1.

FIGS. 2b and 2b show specifically a section of a decoupled area using the example of an etched or printed antenna 2 with an antenna carrier 5.

In another embodiment, the cavities 4 could be filled with a filler material such as silicone, wax, gels or other release agents. This is illustrated in FIGS. 3a and 3b which show the embodiments of FIGS. 2a and 2b (wire antenna 2 or etched or printed antenna 2 on a carrier 5) as non-limiting examples where the cavities 4 are filled with a filler 6.

The mechanical decoupling of the antenna 2 and the surrounding material can also be achieved by leaving out multiple layers 3.1 to 3.5 of the functional laminate in the area of the antenna (FIGS. 2a, 2b, 2c and 2d, layers 3.1 to 3.5). The aim is that the opening provides sufficient space around the antenna's conductors to avoid mechanical connection with the surrounding material for example during a lamination process in order to fulfill the desired aim of decoupling the antenna.

An alternative approach is to introduce one or multiple release layer(s) 7 such as PET, silicone foil or silicone paper or wax in the area of buckling.

The release layers 7 can be designed as layers, which are placed between the antenna and the layers 3.1/3.3 (FIGS. 2c and 4.a) or 3.1/3.5 (FIGS. 2d and 4b) forming the laminate. The release layers can be patches which are assembled into the inlay or they can be screen printed onto the layers 3 prior to the assembly of the inlay.

All of said approaches have the aim of mechanically decoupling the antenna from the surrounding material above and may be used in the zones A and B as indicated in FIG. 1.

Zone A covers the antenna at least in the range of 50 mm to 65 mm from the top edge of a product using the functional laminate, for example a passport. Zone B covers the antenna at least in the range of 30 mm to 50 mm from the other side, for example the spine of a passport. In an alternative approach, the zones A and B at least cover the area where the antenna crosses the document's (for example passport's) main axes as an example of embodiment.

Large cavities 4 in zones A and B have the disadvantage that the antenna cannot be held in place with the accuracy required to maintain the electrical properties. This problem can be addressed by multiple successive small cavities 4 in the zones A and B (see FIG. 5). As the length of these cavities is quite small in comparison with the longitudinal dimension of the antenna, this allow to maintain the geometry of the antenna e.g. pitch, position etc. while a tight mechanical connection between antenna and surrounding material over larger parts of the antenna is avoided.

The different embodiments described herein are given as illustrative examples and should not be construed in a limiting manner. Other constructions and means may be envisaged within the spirit and scope of the present invention, for example via equivalent means. Also, the different embodiments disclosed may be combined together as desired.

The present invention may be used in combination with a chip or chip module to form a RFID transponder. Such transponder may be used in any product, as disclosed in a passport or other similar documents.

The invention claimed is:

1. A functional laminate, comprising: a plurality of layers of support material bonded together, an antenna having a first end and a second end adapted to be connected to a RFID chip, said antenna having at least one winding embedded in the surrounding support material, and means for separating at least one discrete portion of said antenna from the surrounding material, said at least one discrete portion of said antenna located between the first and second ends of the antenna, and wherein said means comprises at least one cavity surrounding said at least one discrete portion of the antenna such that, in said at least one cavity, the at least one discrete portion of the antenna is fully separated from the surrounding material.

2. The functional laminate as defined in claim 1, wherein said at least one discrete portion of said antenna comprises a plurality of separate discrete portions of said antenna, and wherein said means comprises a separate cavity around each said discrete portion of the antenna where each discrete portion of the antenna is fully separated from the surrounding material.

3. The functional laminate as defined in claim 2, wherein each of said cavities comprise an opening in at least one of the plurality of layers of said surrounding material.

4. The functional laminate as defined in claim 3, wherein each of said plurality of layers can be one of an adhesive layer, a thermoplastic layer, a plastic layer, a textile layer, a non woven layer, or a foam layer.

5. The functional laminate as defined in claim 1, wherein said antenna is made of a conductive wire.

6. The functional laminate as defined in claim 1, wherein the winding of said antenna is made of a conductive path, wherein at least one of said at least one discrete portions of the antenna is supported by an antenna carrier, and wherein said antenna carrier associated with said at least one of said at least one discrete portions of said antenna is separated from the support material.

7. The functional laminate as defined in claim 2, wherein said cavities contain a filler material such that the discrete portions of the antenna are embedded in said filler material and fully separated from surrounding material.

8. The functional laminate as defined in claim 1, further comprising at least one release layer positioned in direct proximity of said at least one discrete portion of the antenna, wherein said release layer mechanically disconnects said at least one discrete portion of the antenna from the surrounding material such that the at least one discrete portion of the antenna does not follow movement of the surrounding material.

9. The functional laminate as defined in claim 1, wherein said at least one cavity is located in at least one of zones A and B of the functional laminate.

10. The functional laminate as defined in claim 1, wherein said at least one discrete portion of said antenna has a curved or meander shape design.

11. The functional laminate as defined in claim 1, wherein the functional laminate comprises a flexible identity document.

12. The functional laminate as defined in claim 6, wherein said conductive path comprises a printed or etched element.

13. The functional laminate as defined in claim 9, wherein the functional laminate is substantially rectangular with first and second edges spaced apart and substantially parallel, third and fourth edges spaced apart and substantially parallel, and wherein the third and fourth edges are longer than the first and second edges, and wherein Zone A is between at least 50 to 65 millimeters from the first and second edges.

14. The functional laminate as defined in claim 13, wherein Zone B is between at least 30 to 50 millimeters from the third and fourth edges.

15. The functional laminate as defined in claim 11, wherein the flexible identity document comprises a passport or passport cover.

16. A functional laminate, comprising: a plurality of layers of material bonded together, an antenna having a first end and a second end adapted to be connected to a RFID chip, said antenna having at least one winding embedded in the material, and means for separating at least one discrete portion of said antenna from the surrounding material, said at least one discrete portion of said antenna located between the first and second ends of the antenna, wherein said means comprises at least one release layer positioned in direct proximity of said at least one discrete portion of the antenna, and wherein said release layer mechanically disconnects said at least one discrete portion of the antenna from the surrounding support material.

17. The functional laminate as defined in claim 16, further comprising a first release layer disposed on one side of said at least one discrete portion of the antenna and a second release layer disposed on a second side of said at least one discrete portion of the antenna.

18. The functional laminate as defined in claim 16, wherein said at least one release layer comprises at least one of a patch and a screen printed material.

19. The functional laminate as defined in claim 16, wherein said at least one release layer comprises at least one of polyethylene terephthalate, silicone foil, silicone paper and wax.

* * * * *